United States Patent

Chazen et al.

[11] 4,033,458
[45] July 5, 1977

[54] METHOD AND APPARATUS FOR CLEANING SHREDDED SCRAP

[76] Inventors: Julius L. Chazen, 936 Mountain Creek Road, Chattanooga, Tenn. 37405; James Donald Brock, 524 Northcrest, Chattanooga, Tenn. 37404

[22] Filed: Mar. 19, 1975

[21] Appl. No.: 560,017

[52] U.S. Cl. .............. 209/11; 209/472; 209/473; 209/482; 209/483; 241/20; 241/24; 241/57; 241/58; 241/79.1
[51] Int. Cl.² .............................. B03B ; B07B
[58] Field of Search ........... 209/11, 473, 482, 483, 209/472; 241/20, 24, 57, 58, 79, 79.1

[56] References Cited

UNITED STATES PATENTS

| | | | |
|---|---|---|---|
| 1,347,608 | 2/1920 | Wilcox | 209/13 X |
| 1,673,848 | 6/1928 | Stebbins | 209/473 X |
| 2,100,734 | 11/1937 | Crites | 209/133 X |
| 2,381,351 | 8/1945 | Hurdinge | 241/24 X |
| 2,662,694 | 12/1953 | Lotz | 241/57 X |
| 3,291,398 | 12/1966 | Weston | 241/24 |
| 3,804,249 | 4/1974 | Gibbons | 209/482 X |
| 3,848,813 | 11/1974 | Stanczyk | 241/24 X |
| 3,856,217 | 12/1974 | Brewer | 241/24 X |
| 3,925,198 | 12/1975 | Eckhoff | 209/3 |

OTHER PUBLICATIONS

Joseph Co. Publication, 241/79, pp. 2-8, 1966.

Primary Examiner—Bernard Nozick
Assistant Examiner—Frank Sever
Attorney, Agent, or Firm—Wheeler, Morsell, House & Fuller

[57] ABSTRACT

Shredded scrap is conveyed from a heat generating automobile shredder to one end of a horizontal tumbling drum and is caused to move in one direction through the drum as it tumbles. An air stream which has aspirated heat generated by the shredder, and carrying particulate material removed from the scrap in the shredder, is directed by ductwork to the opposite end of the tumbling drum where the air and particulate matter move in counterflow through the tumbling scrap to remove additional particulate material therefrom as the shredded particles are being showered through the air stream. The particulate material in the air stream emerging from the tumbling drum is separated out by a cyclonic separator. A bypass air stream duct with an adjustable valve bypasses some of the air stream around the tumbling drum to control the velocity of the air stream through the tumbling drum and thus to control the size of the particulate material removed from the scrap by the counterflow air stream. The cleaned scrap which leaves the tumbling drum drops onto a pan feeder and slides down the feeder pan to a rotary magnetic separator which separates the ferrous scrap from the non-ferrous scrap.

8 Claims, 2 Drawing Figures

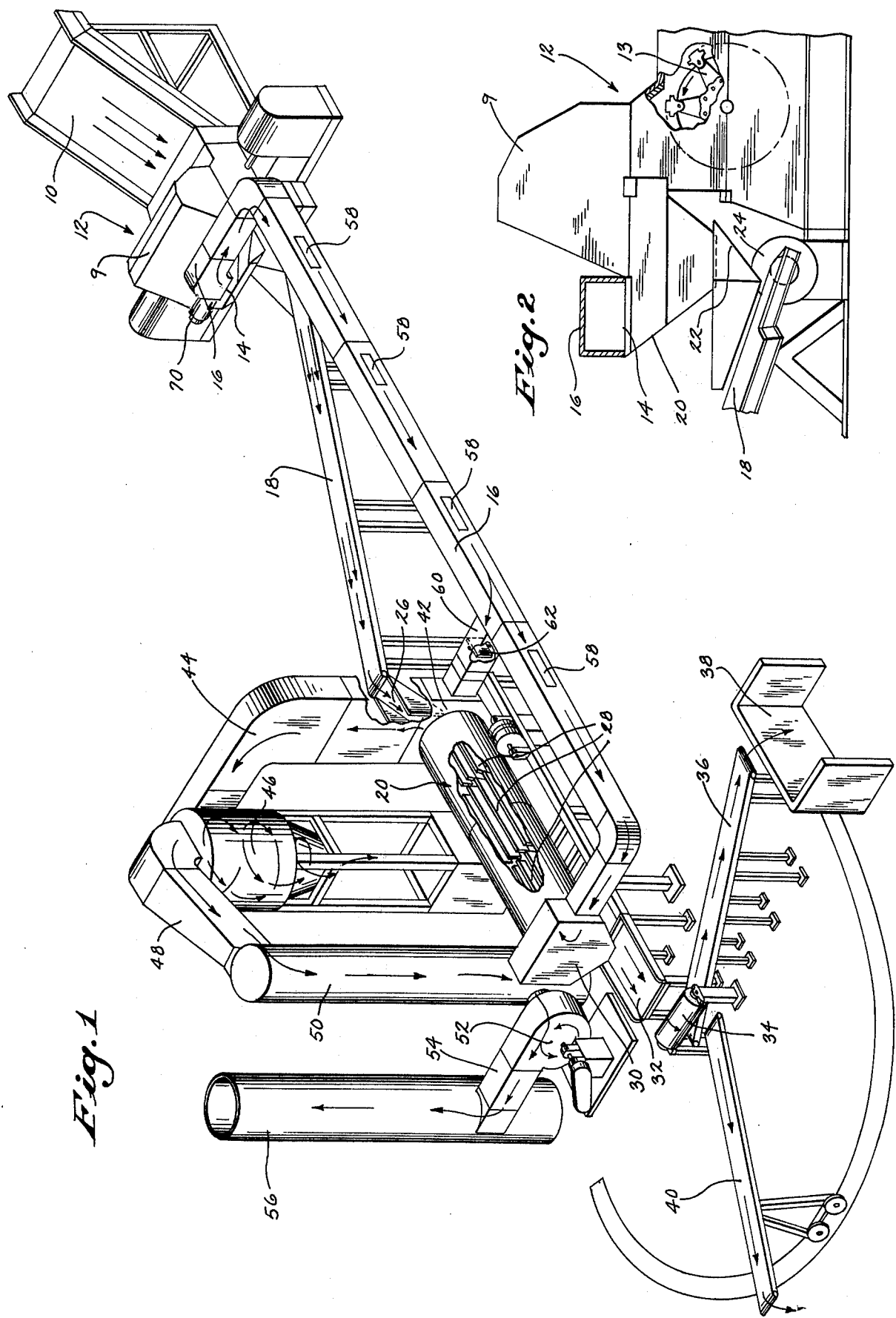

METHOD AND APPARATUS FOR CLEANING SHREDDED SCRAP

BACKGROUND OF THE INVENTION

This invention relates to a method and apparatus for cleaning shredded scrap such as produced by an automobile shredder or by other suitable shredders for metal articles. The shredded scrap discharged from an automobile shredder contains a mixture including ferrous and non-ferrous scrap together with particulate material which includes dust and dirt and shredded cushions, fabric, and other non-metallic material from the automobile. Before the metallic scrap can be processed, it is desirable to remove most of the non-metallic particulate material. In the past, this has been done by conveying the mixed scrap out of the shredder on a bar grid through which an air stream is sucked to separate some of the non-metallic particulate material from the metallic fragments, the bar grid feeding the material by gravity onto a second conveyor. The particulate material in the air stream is separated out in a series of cyclonic separators, three of which are required in the conventional system to adequately clean the shredded scrap.

Water is used in this prior art shredder to hold down the dust, as otherwise there would have been substantial dust leakage to the atmosphere.

The principal object of this invention is to provide a simpler and more efficient method and apparatus for cleaning shredded metal scrap while effectively preventing leakage of dust and pollution of the air.

A further object of the invention is to provide a method and apparatus in which use of water in the shredder is eliminated so as not to interfere with the heat generated in the shredder, and wherein said heat is utilized in the duct work to prevent the buildup of particulate material in the ducts leading from the shredder.

A further object of the invention is to provide a method and apparatus for cleaning scrap wherein all of the air for the system is picked up at the shredder together with dust from the shredder, thereby eliminating any dust leakage at the shredder.

Other objects and advantages of the invention will become apparent to those skilled in the art from the disclosure herein.

SUMMARY OF THE INVENTION

In the method and apparatus of this invention, the shredded scrap is conveyed along one path from the heat generating shredder to one end of a tumbling drum, and an air stream which furnishes all of the air for the system is picked up at the shredder, which air stream also carries particulate material away from the shredder. This air and particulate material is directed by duct work into the tumbling drum, preferably to move in counterflow to the scrap and remove more particulate material from the tumbling scrap. Sufficient particulate material is removed in the tumbling drum to preclude the necessity of further removal of particulate material. The particulate material in the air stream leaving the tumbling drum may be separated by a single cyclonic separator instead of by the three or more previously employed. In the preferred embodiment, no water is used in the shredder to cool the shredder and hold down dust as is customary. Instead the shredder is permitted to generate heat and this heat is employed in a novel way to raise the temperature in the duct work above the dewpoint, thereby eliminating condensation and buildup of particulate material in the ducts. As an alternative, a small burner may be employed to inject heated air into the duct work.

DESCRIPTION OF THE DRAWINGS

FIG. 1 is a perspective view of an automobile shredding system utilizing one embodiment of the invention, portions of the tumbling drum being cut away to reveal inner details.

FIG. 2 is a side elevational view of the automobile shredder shown in FIG. 1, portions of the shredders' side wall being broken away to reveal inner details.

DESCRIPTION OF THE PREFERRED EMBODIMENT

Referring to FIG. 1, flattened scrap automobiles are fed down a chute 10 into an automobile shredder 12 which reduces the automobiles to a mixture including ferrous and non-ferrous fragments and non-metallic particulate material which includes dust, dirt, shredded cushions, fabric, and other pulverized non-metallic material. The shredder 12 comprises a hammermill 13 or similar device, having a scavenge hood 9.

All of the air for the system enters the inlet end of the shredder, passes through the shredder and into the scavenge hood 9, and then moves into the aspiration area 14 and out of the duct work 16. The movement of air is caused by the exhaust fan 52 which forms a dynamic precipitator to be hereinafter referred to. The air passing through the shredder picks up all the lighter non-metallic particulate material which does not adhere to the heavier shredded particles. The heavier shredded fragments together with any particulate material adhering thereto falls onto the inclined conveyor belt 18 which carries them to one end of a tumbling drum 20 for further removal of particulate material as described hereinafter.

Heretofore it has been customary to use a spray of water in the shredder in order to kill the dust which in conventional systems would have leaked out into the atmosphere. With the present system, due to the use of the hood 9 and aspirating arrangement, no free dust is permitted to escape at the shredder. With the present system no water is used at the shredder, as the dust is all removed in the ducts 16, and water is purposely omitted so that it will not dissipate the heat generated by the shredding action, as this heat is made use of in a manner to be hereinafter described.

FIG. 2 shows the discharge end of shredder 12 more clearly. The shredded material is ejected out of shredder 12, first into the hood 9 and then through a discharge chute 20 below aspiration area 14, the heavier material falling onto an inclined wall 22 which directs it onto conveyor 18, and the lighter particulate material being sucked up into duct 16 with the air stream, through aspiration area 14.

Conveyor 18 is driven by a conventional motor 24 and carries the shredded ferrous and non-ferrous material to a point above an input chute 26 to tumbling drum 20. The axis of tumbling drum 20 is inclined downwardly by approximately 4° in this embodiment so that gravity together with the flight inclination and arrangement in the drum will cause the shredded material to move through drum 20 from right to left in FIG. 1 as it tumbles. A series of flights 28 within drum 20 causes the scrap both to travel and to tumble and shower as the drum rotates, as is well known in the art. The flights pick the material up and drop it forward with each revolution. Rotation of the drum is effected by conventional drive means which is not visible in FIG. 1.

Duct 16, which carries the air stream from aspiration area 14 of automobile shredder 12, is coupled to a scrap discharge breeching 30 on the outlet end of tumbling drum 20 to introduce the air stream into drum 20 in counterflow. The air stream passes through the tumbling scrap in drum 20 and carries away the particulate material which was not picked up at the first aspiration in shredder 12. The cleaned scrap discharges from the bottom of discharge breeching 30 onto a feeder pan 32 and from there drops down onto a rotary magnetic separator 34. The nonferrous metal drops from pan 32 onto a conveyor 36 which carries it to a holding pit 38. The ferrous metal drops from magnetic separator 34 onto a movable conveyor 40 which conveys the metal to any desired point around an arc through which conveyor 40 is movable. Conveyors 36 and 40 are driven by conventional means not shown in the drawing.

A scrap inlet breeching 42 is coupled to the scrap inlet and air outlet end of tumbling drum 20 to admit the scrap into drum 20 and direct the air stream and particulate matter away. A duct 44 directs the outlet air stream into a cyclonic separator 46 which separates the heavier particulate material from the air stream in the conventional manner. The partially cleansed air stream is then carried by duct 48 through a conventional air washer 50, thence through an exhaust fan 52 forming a dynamic precipitator. This fan has wetted blades which collect the dust, the latter being slung tangentially, via duct 54, to a vertical stack 56 which serves as a water separator for the water which has entrained the fine particles in the wetted fan. The cleaned air discharges from the top of stack 56. The exhaust fan 52 is the sole source of air movement in the system.

In order to protect the duct work from gas tank explosions in automobile shredder 12, blow-out panels 58 are provided in duct 16.

A bypass duct 60, having a suitable valve 62, is coupled around drum 20 from duct 16 to scrap inlet breeching 42. The valve is preferably an opposed blade damper. By changing the setting of valve 62, the velocity of the counterflow air stream passing through drum 20 can be varied, thereby varying the size of the particulate material removed from the tumbling scrap. The air stream through drum 20 has the greatest velocity when valve 62 is fully closed, and the least when valve 62 is fully opened.

Due to the relatively long exposure of the scrap to the air stream in drum 20, and to the tumbling and showering of the scrap within the drum, the scrap is cleaned very thoroughly to eliminate the need for further cleaning, and the air stream from drum 20 can be cleaned in a single cyclonic separator rather than by the use of three or more as previously employed. the heat generated by the shredding action therein is carrid by the air stream through hood 9 and into duct 16, raising the temperature in duct 16 above the dewpoint of the air stream, thereby eliminating condensation and build-up of particulate material in duct 16. To achieve this heating effect, the aspiration area 14 is located in a position that will draw the air stream across a heat-generating portion of automobile shredder 12 and into hood 9 and duct 16. It is well known that this type of automobile shredder generates heat well above the ambient temperature, and the present method makes use of this heat. As an alternative, instead of using heat generated in the shredder, a small burner 70 may be connected to the duct work and this may be used to raise the temperature in the duct 16 above the dewpoint.

With the present invention, the material stays in the rotating drum from two to four minutes, depending on the flight design and slope of the drum. In the cnventional system, the material only stays in the air stream for a matter of seconds, usually less than 5 to 10 seconds total. With this invention there is considerably more dwell time in the air stream, and this allows much more efficient cleaning.

Various changes and modifications may be made without departing from the spirit of the invention, and all of such changes are contemplated as may come within the scope of the claims.

What we claim is:

1. A method of cleaning shredded scrap from a heat-generating shredder for metal articles comprising conveying relatively heavy shredded material away from the shredder along a first path, utilizing an air stream to convey scavenge air away from the shredder in a confined second path, directing the material from the first path into a tumbling drum and causing the material to be moved through said drum and to be discharged therefrom, directing the air stream with said scavenge air from said second path into said tumbling drum to entrain particulate material which has entered said drum with said heavy shredded material, directing said air stream with the scavenge air away from the tumbling drum, separating said particulate material from said air stream, bypassing a portion of said air stream from said second path around said tumbling drum to vary the velocity of air flow though said drum, and then merging said bypassed air stream with the air stream leaving said tumbling drum.

2. The method of claim 1 and futher comprising the step of controlling the volume of the bypass air stream to vary the velocity of air flow through said drum.

3. A method of cleaning shredded scrap from a heat-generating shredder for metal articles comprising conveying relatively heavy shredded material away from the shredder along a first path, utilizing an air stream to convey scavenge air away from the shredder in a confined second path, directing the material from the first path into a tumbling drum and causing the material to be moved through said drum and to be discharged therefrom, directing the air stream with said scavenge air from said second path into said tumbling drum to entrain particulate material which has entered said drum with said heavy shredded material, directing said air stream with the scavenge air away from the tumbling drum, separating said particulate material from said air stream, utilizing metal duct work to confine the air stream in said second path, and raising the temperature of the air stream sufficiently to cause heating of the duct work above the dewpoint to thereby prevent condensation of moisture and build-up of particulate matter on the interior of said duct work.

4. The method of claim 3 wherein the raising of the temperature of the air stream in the duct work is accomplished by causing the air stream to aspirate heat from a heat-generating portion of the shredder.

5. The method of claim 3 wherein the raising of the temperature of the air stream in the duct work is accomplished by injecting heated air into the duct work.

6. Apparatus for cleaning shredded scrap from a heat-generating shredder for metal articles comprising a tumbling drum, means for conveying relatively heavy shredded material from said shredder to said tumbling drum, said drum having means for causing the heavy material to be moved through said drum as it is being tumbled therein and to be discharged from the opposite end thereof, conduit means connected between said drum and the outlet of said shredder for receiving an air stream with scavenge air from said shredded scrap and for conveying it to said tumbling drum, means for causing movement of said air stream through said shredder, and through said conduit means and drum to remove particulate material from the tumbling scrap in the drum, means for directing said air stream with particulate material therein away from said tumbling drum, means for separating said particulate material from said air stream, bypass means for bypassing a portion of said air stream from said conduit means around said tumbling drum to control the velocity of air flow through said drum and thus to control the size of the particulate material removed from said shredded scrap in said tumbling drum.

7. The apparatus of claim 6 and further comprising a valve in said bypass means to vary the volume of bypass air flowing therethrough.

8. Apparatus for cleaning shredded scrap from a heat-generating shredder for metal articles comprising a tumbling drum, means for conveying relatively heavy shredded material from said shredder to said tumbling drum, said drum having means for causing the heavy material to be moved through said drum as it is being tumbled therein and to be discharged from the opposite end thereof, conduit means connected between said drum and the outlet of said shredder in such a location as to receive a heated air stream with scavenge air from said shredded scrap and convey it to said tumbling drum to provide the air supply therefor, means for causing movement of said air stream through said shredder, and through said conduit means and drum to remove particulate material from the tumbling scrap in the drum, means for directing said air stream with particulate material therein away from said tumbling drum, means for separating said particulate material from said air stream, the connection of the conduit with the shredder being in such a location as to receive an air stream heated by heat generated by the shredder to cause the temperature of the air stream in the conduit means to be raised above the dewpoint, thereby preventing condensation of moisture on the interior of said conduit means, and thereby preventing buildup of particulate material on the interior of said conduit means, there being heating means connected with said conduit means whereby the temperature of the air stream in said conduit means is raised above the dewpoint to prevent condensation of moisture on the interior of said conduit means, thereby preventing build-up of particulate material on the interior of said conduit means.

* * * * *